United States Patent
Sugiyama et al.

(10) Patent No.: US 11,008,988 B2
(45) Date of Patent: May 18, 2021

(54) ELECTRONIC CONTROL DEVICE AND ABNORMALITY/NORMALITY DETERMINATION METHOD OF ELECTRONIC CONTROL DEVICE

(71) Applicant: HITACHI AUTOMOTIVE SYSTEMS, LTD., Ibaraki (JP)

(72) Inventors: Yasushi Sugiyama, Hitachinaka (JP); Atsushi Arata, Hitachinaka (JP); Yasuo Shima, Hitachinaka (JP); Masahiro Doi, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/487,382

(22) PCT Filed: Jan. 29, 2018

(86) PCT No.: PCT/JP2018/002636
§ 371 (c)(1),
(2) Date: Aug. 20, 2019

(87) PCT Pub. No.: WO2018/155084
PCT Pub. Date: Aug. 30, 2018

(65) Prior Publication Data
US 2020/0056570 A1  Feb. 20, 2020

(30) Foreign Application Priority Data
Feb. 21, 2017  (JP) .............................. JP2017-029838

(51) Int. Cl.
*F02M 51/00*  (2006.01)
*F02D 41/22*  (2006.01)
*F02M 51/06*  (2006.01)

(52) U.S. Cl.
CPC ........... *F02M 51/005* (2013.01); *F02D 41/22* (2013.01); *F02M 51/061* (2013.01); *F02D 2041/226* (2013.01)

(58) Field of Classification Search
CPC .... F02M 51/005; F02M 51/061; F02D 41/22; F02D 2041/226
(Continued)

(56) References Cited

U.S. PATENT DOCUMENTS

2016/0160783 A1* 6/2016 Fujita ................... F02D 41/221
701/103
2016/0177855 A1* 6/2016 Kusakabe ............ F02M 65/005
123/490

FOREIGN PATENT DOCUMENTS

JP  2002-324710 A  11/2002
JP  2003-113732 A  4/2003
(Continued)

OTHER PUBLICATIONS

International Search Report dated May 29, 2018 for the PCT International Application No. PCT/JP2018/002636.

*Primary Examiner* — Joseph J Dallo
*Assistant Examiner* — Yi-Kai Wang
(74) *Attorney, Agent, or Firm* — Volpe Koenig

(57) ABSTRACT

An electronic control device has a compact abnormality detection circuit that does not require a complicated circuit, and is capable of suppressing a cost increase when being applied a direct injection injector drive circuit and other drive circuits. A current detection circuit includes a current detection resistor, a differential amplifier, and a current detection unit. The current detected is supplied to the abnormality/normality determination unit. A combined resistance value of a diagnostic current drive circuit and the current detection resistor is higher than an injector drive circuit. A fuel injection signal is input to a logic circuit, and
(Continued)

a fuel cut signal is input to a different terminal of the logic circuit. The logic circuit's output terminal is connected to the injector drive circuit's gate. The output signal from a fuel injection signal output unit is supplied via a switch to the diagnostic current drive circuit's gate.

13 Claims, 4 Drawing Sheets

(58) Field of Classification Search
USPC .......................................................... 123/446
See application file for complete search history.

(56) References Cited

FOREIGN PATENT DOCUMENTS

| | | | |
|---|---|---|---|
| JP | 2013-024080 A | 2/2013 | |
| JP | 2016-108984 A | 6/2016 | |
| WO | 03/014555 A1 | 2/2003 | |
| WO | WO-2015015541 A1 * | 2/2015 | ........... F02M 65/005 |

* cited by examiner

ELECTRONIC CONTROL DEVICE AND ABNORMALITY/NORMALITY DETERMINATION METHOD OF ELECTRONIC CONTROL DEVICE

TECHNICAL FIELD

The present invention relates to an electronic control device and an abnormality/normality determination method of an electronic control device.

BACKGROUND ART

In an electronic control device (ECU) that controls an engine, for example, a technique for cutting fuel injection is applied when a calculation abnormality occurs in a microcomputer mounted on a vehicle.

Thus, a fuel cut signal to forcibly set an injector drive circuit to an OFF state is provided in addition to a fuel injection signal to turn on or off the injector drive circuit configured to inject fuel from an injector. The microcomputer that detects an error between an actual engine torque and a calculated torque may take charge of the fuel cut signal, or a microcomputer monitoring function of detecting a control abnormality of the microcomputer may take charge of the fuel cut signal.

For example, in a case where an abnormality occurs in the fuel cut signal due to a certain cause and the fuel cut signal is stuck in a fuel injection permission state, it is difficult to perform fuel cut when the microcomputer abnormality occurs, and thus, it is difficult to perform operation control of the vehicle with high accuracy.

Thus, it is necessary to check at least once that the fuel cut signal normally operates after a vehicle driver turns on an ignition key before the vehicle driver turns off the ignition key and the ECU stops.

Further, the function of outputting the fuel cut signal is a function related to safety of the vehicle, and it is regarded that it is desirable to check the function before starting the engine.

In order to check the normal operation of the fuel cut signal, it is necessary to check that a current flowing to the injector is actually cut by outputting the fuel cut signal in a state where the current has flown to the injector.

If the above method is simply used, however, unnecessary fuel is injected because there is a state where the current flows to the injector.

Therefore, in a technique described in PTL 1, in order not to inject unnecessary fuel, an injector drive circuit is turned on or off, and it is checked that a fuel cut signal normally operates in a state where a current has flown to an injector to such an extent that does not inject fuel.

CITATION LIST

Patent Literature

PTL 1: JP 2016-108984 A

SUMMARY OF INVENTION

Technical Problem

A certain amount of current or more is required in order to inject fuel by the injector.

If the technique described in PTL 1 is used, it is possible to cause a minute current to flow to the injector so that unnecessary fuel is not injected. Thus, it is possible to check whether the fuel cut signal normally operates before starting an engine.

However, the current used for checking whether the fuel cut signal normally operates is minute, but it is necessary to cause a large current to flow to the injector in actual driving, and a large current also flows to a current detection circuit.

Thus, it is necessary to increase a size of the current detection circuit, which is problematic in terms of space and cost.

In addition, when checking the operation of the fuel cut signal, feedback control for making the current minute is required so as to prevent the injector from injecting fuel, and a control circuit for the feedback control is complicated, which causes a cost increase.

In a case where the technique described in PTL 1 is applied to a direct injection injector drive circuit, it is possible to suppress the cost increase by using an existing circuit, but it is difficult to avoid the cost increase in a case where the technique is applied to circuits other than the direct injection injector drive circuit.

An object of the present invention is to provide an electronic control device, which has an abnormality detection circuit that is compact, does not require a complicated circuit, and is capable of suppressing a cost increase when being applied to not only a direct injection injector drive circuit but also other drive circuits, and an abnormality/normality determination method of the electronic control device.

Solution to Problem

In order to achieve the above object, the present invention is configured as follows.

An electronic control device including: an injector drive unit that causes an injector driving current to flow to an injector which injects fuel; a logic unit that is supplied with a fuel injection signal and a fuel cut signal and drives the injector drive unit according to the fuel injection signal and the fuel cut signal; a current detection unit that detects a resistance value larger than a resistance value of the injector drive unit and detects a minute current flowing to the injector; and an abnormality/normality determination unit that determines whether the fuel cut signal is normally supplied to the logic unit based on the minute current detected by the current detection unit.

In an abnormality/normality determination method of an electronic control device, which includes: an injector drive unit that causes an injector driving current to flow to an injector which injects fuel; a logic unit that is supplied with a fuel injection signal and a fuel cut signal and drives the injector drive unit according to the fuel injection signal and the fuel cut signal; and a current detection unit that detects a resistance value larger than a resistance value of the injector drive unit and detects a minute current flowing to the injector, it is determined whether the fuel cut signal is normally supplied to the logic unit based on the minute current detected by the current detection unit.

Advantageous Effects of Invention

It is possible to realize the electronic control device, which has the abnormality detection circuit that is compact, does not require the complicated circuit, and is capable of suppressing the cost increase when being applied to not only the direct injection injector drive circuit but also other drive circuits, and the abnormality/normality determination method of the electronic control device.

DESCRIPTION OF EMBODIMENTS

Hereinafter, embodiments of the present invention will be described with reference to accompanying drawings.

Embodiments

First Embodiment

Figure 1:
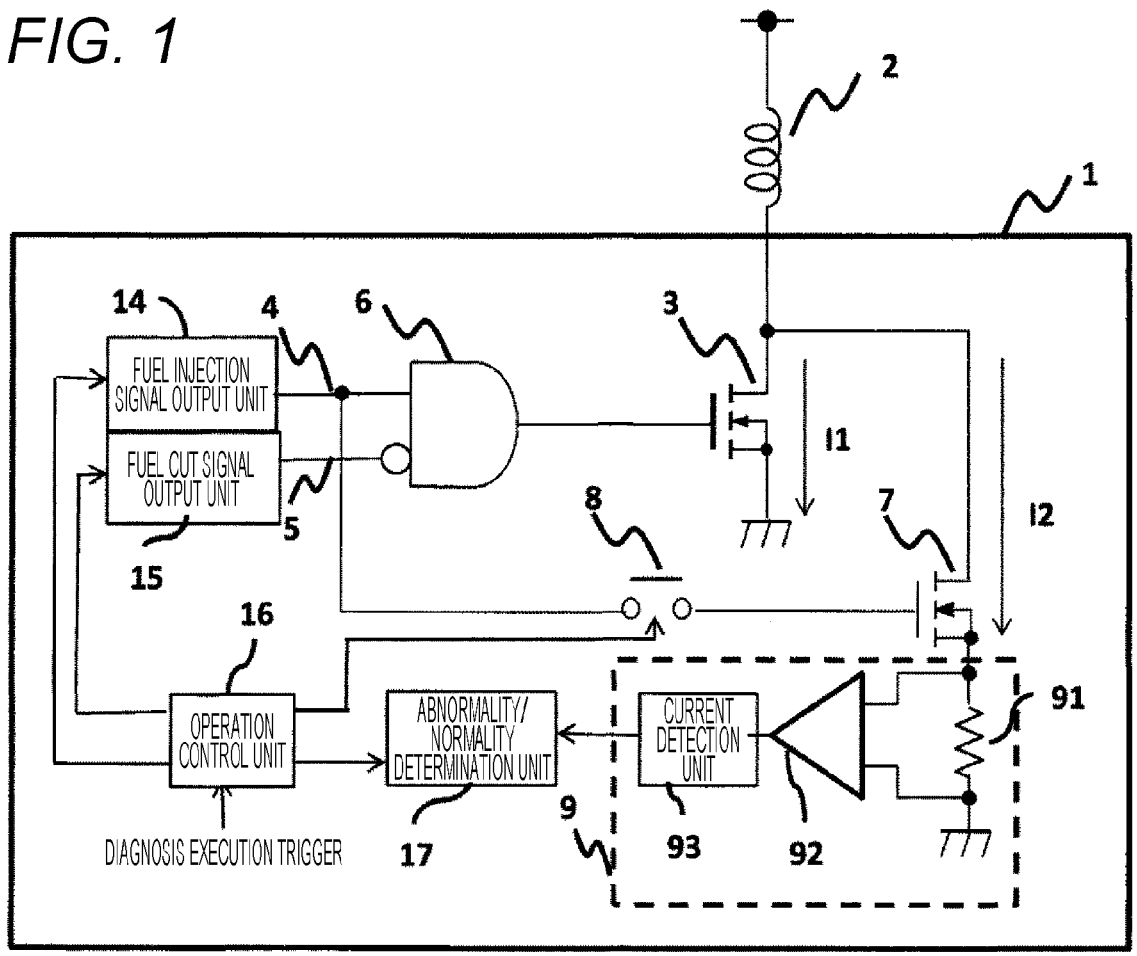
FIG. 1 is a schematic configuration diagram of an electronic control device according to a first embodiment of the present invention, and is a block diagram illustrating an example in which the electronic control device is arranged in an engine ECU.

FIG. 1 is a schematic configuration diagram of an electronic control device according to a first embodiment of the present invention, and is a block diagram illustrating an example in which the electronic control device is arranged in an engine ECU 1.

In FIG. 1, an electronic control device according to the first embodiment of the present invention includes: an injector drive circuit (injector drive unit) 3 (FET in the example illustrated in the drawing) that drives an injector 2 configured to inject fuel; a fuel injection signal output unit 14 that outputs a fuel injection signal 4 to drive the injector drive circuit 3; a fuel cut signal output unit 15 that outputs a fuel cut signal 5 to permit or prohibit driving of the injector drive circuit 3 by the fuel injection signal 4; a logic circuit (logic unit) 6; a diagnostic current drive circuit 7 (FET in the example illustrated in the drawing) that is different from the injector drive circuit 3 and flows a minute current to the injector 2; a switch 8 (SW1 (first switch)) mounted between the fuel injection signal 4 and the diagnostic current drive circuit 7; a current detection circuit 9 that detects a current flowing to the diagnostic current drive circuit 7; an abnormality/normality determination unit 17 that determines an abnormality/normality of the fuel cut signal 5 based on the current detected by the current detection circuit 9; and an operation control unit 16.

The current detection unit 9 includes: a current detection resistor 91 that has one end connected to a source of the FET, which is the diagnosis circuit 7, and the other end grounded; a differential amplifier 92 that has input terminals to which both ends of the current detection resistor 91 are connected; and a current detection unit 93 connected with an output terminal of the differential amplifier 92. The current detected by the current detection unit 93 is supplied to the abnormality/normality determination unit 17.

A combined resistance value of the diagnostic current drive circuit 7 and the current detection resistor 91 is larger than a resistance value of the injector drive circuit 3.

The injector 2 is connected to a drain of the FET which is the injector drive circuit 3. In addition, a source of the injector drive circuit 3 is grounded. The drain of the injector drive circuit 3 is connected to a drain of the FET which is the diagnostic current drive circuit 7.

The fuel injection signal 4 is input to an input terminal of the logic circuit 6, and the fuel cut signal is input to a negative input terminal of the logic circuit 6. An output terminal of the logic circuit 6 is connected to a gate of the injector drive circuit 3.

The output signal 4 from the fuel injection signal output unit 14 is supplied to a gate of the diagnostic current drive circuit 7 via the switch 8.

The operation control unit 16 controls operations of the fuel injection signal output unit 14, the fuel cut signal output unit 15, the switch 8, and the abnormality/normality determination unit 17.

In the example illustrated in FIG. 1, it is configured such that a case where the fuel cut signal 5 is low (L) is a permission state regarding the fuel cut signal 5 and the logic circuit 6. Incidentally, a type and a form of the logic circuit 6 are not specified, and various modifications can be made.

Figure 2:
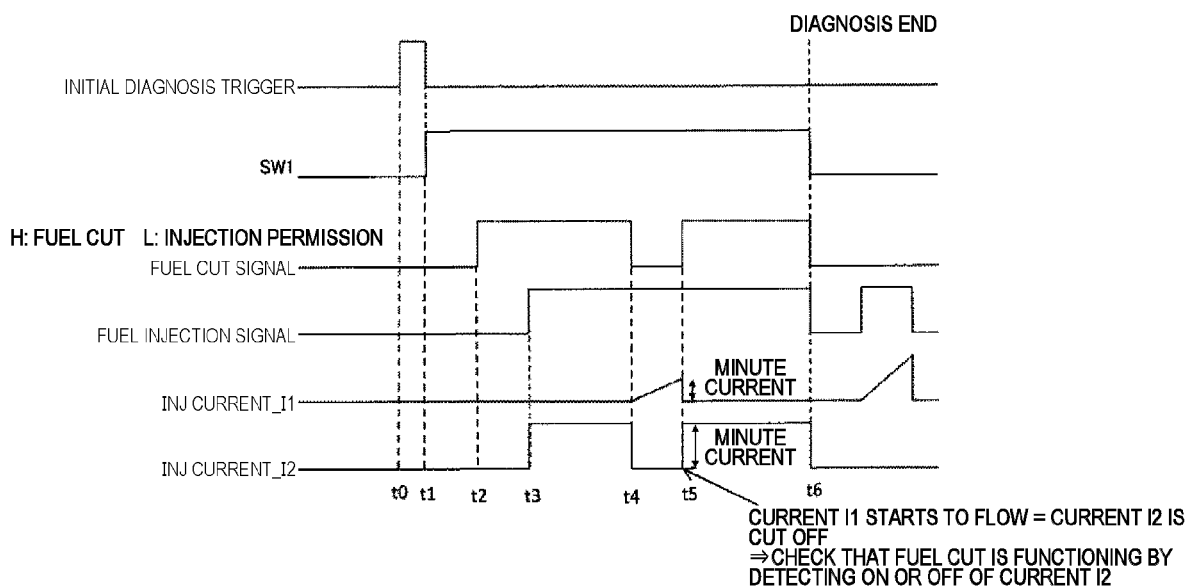
FIG. 2 is a diagram illustrating a diagnostic sequence of a fuel cut signal in a circuit configuration of FIG. 1.

FIG. 2 is a diagram illustrating a diagnostic sequence of the fuel cut signal 5 in the circuit configuration of FIG. 1.

In FIG. 2, when an initial diagnosis execution trigger is input to the operation control unit 16 at a time t0, the operation control unit 16 turns on the switch 8 (SW1) that has been turned off at a time t1. At this time, both the fuel injection signal 4 and the fuel cut signal 5 are in the low (L) state.

At a time t2, the fuel cut signal 5 is set to high (H), that is, a prohibition side, and then, the fuel injection signal 4 is set to high (H) at a time t3 Then, the fuel injection signal 4 is supplied to the gate of the diagnostic current drive circuit 7 through the switch 8, and the diagnostic current drive circuit 7 is turned on.

Meanwhile, at the time t3, since the fuel cut signal 5 is in the H state, an output of the logic circuit 6 is zero, and the drive circuit 3 is in the OFF state. Accordingly, a current I1 (injector driving current) does not flow to the drive circuit 3, but a current I2 flows to the injector 2, the diagnostic current drive circuit (diagnostic current drive unit) 7, and the current detection resistor 91.

Since the diagnostic current drive circuit 7 and the current detection circuit 9 have sufficiently high resistance values, as the current I2, only the minute current flows to such an extent that the injector 2 does not inject fuel.

In this state, when the fuel cut signal 5 is set to low (L) at a time t4, the output of the logic circuit 6 becomes one, the injector drive circuit 3 is turned on, and the current I1 starts to flow to the injector 2 and the injector drive circuit 3 and the current increases. In such a case, since the current I2 is an extremely small current, the current flowing as the current I2 becomes substantially zero when the current I1 starts to flow to the injector drive circuit 3.

Further, the fuel cut signal 5 is set to high (H) at a time t5 before the injector 2 injects fuel, that is, in a state where the current I1 is the minute current before becoming the magnitude of injecting the fuel by the injector 2. As a result, the output of the logic circuit 6 becomes zero, and the injector drive circuit 3 is turned off, and thus, the fuel is not injected, the current I1 is set to the OFF state, and the current I2 starts to flow.

A current change of the current I2 is detected as the abnormality/normality determination unit 17 detects the current detected by the current detection unit 93 of the current detection circuit 9, and it is possible to check that the fuel cut signal 5 is normally operating by determining that the current I2 is changing in response to high and low command signals of the fuel cut signal 5 of the operation control unit 16.

At a time t6, the diagnosis is ended, the switch 8 is turned off, and the fuel cut signal 5 is also set to L. Further, the current I1 flowing to the injector 2 is controlled by the ON/OFF control of the injector drive circuit 3.

In this manner, a short pulse to such an extent that fuel is not injected by the injector 2 is input as the fuel cut signal 5 so as to set the current of the extent that does not cause fuel injection to high and low, whereby it is possible to check that the fuel cut signal 5 is operating.

Figure 3:
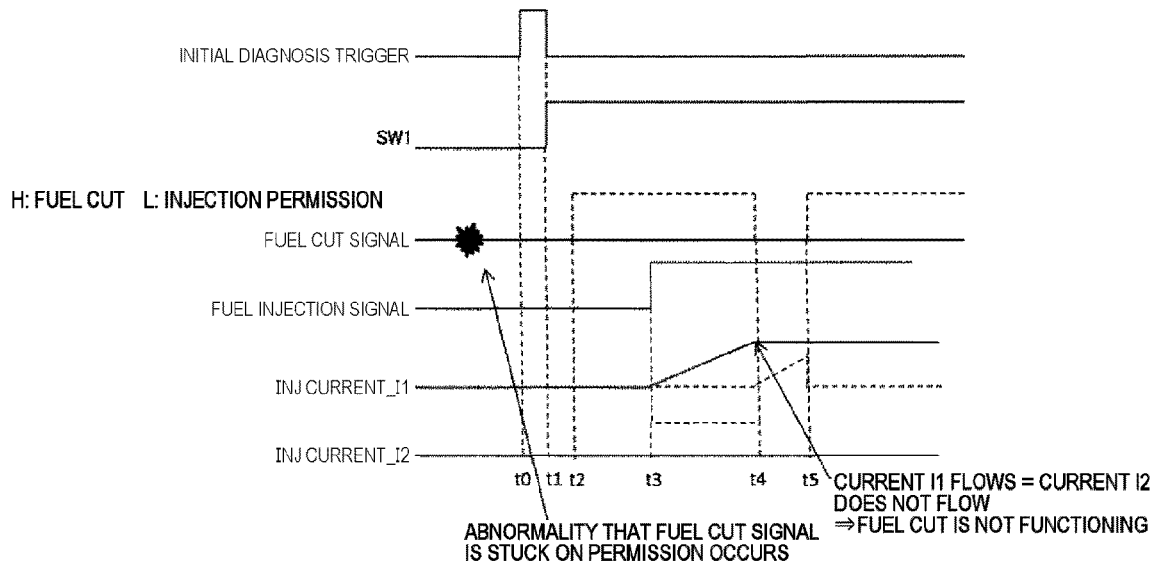
FIG. 3 is a diagram illustrating a sequence in a case where an abnormality occurs in the fuel cut signal in the case of using the circuit configuration illustrated in FIG. 1.

FIG. 3 is a diagram illustrating a sequence in a case where an abnormality occurs in the fuel cut signal 5 in the case of using the circuit configuration illustrated in FIG. 1.

As an example of the abnormality, a case where the fuel cut signal 5 is stuck on a fuel cut permission side will be exemplified.

In FIG. 3, when a diagnosis execution trigger is input at a time t0, the switch 8 (SW1) is turned on at a time t1, and the fuel injection output unit 14 is connected to the diagnostic current drive circuit 7 via the switch 8.

At a time t2, the fuel cut signal 5 is actually set to low (L) (Indicated by broken lines) although the fuel cut signal 5 is desirably set to high (H) since the abnormality of being stuck to the permission side has occurred before the time t0.

When the fuel injection signal 4 is set to high (H) at a time t3, the injector drive circuit 3 is turned on, and the current I1 flows since the fuel cut signal is in the low (L) state. In this case, the abnormality/normality determination unit 17 can detect that the current that needs to originally flow to the current I2 does not flow, and it is possible to detect the abnormality of the fuel cut signal 5. When the abnormality has been detected, it is possible to avoid fuel injection during the diagnosis by setting the fuel injection signal 4 to low (L) before the current I1 becomes a large current and the fuel is injected from the injector 2.

According to the above first embodiment, the current detection circuit 9 detects the current I2 changing with the short pulse of the fuel cut signal 5 so that it is possible to check that the fuel cut signal 5 can cut off the current I1 to stop the fuel injection of the injector 2.

That is, according to the first embodiment, the resistance values of the diagnostic current drive circuit 7 and the current detection resistor 91 of the current detection circuit 9, which are connected in parallel to the injector drive circuit 3, are set to sufficiently large values as compared with the resistance value of the injector drive circuit 3, and thus, a large current flowing to the injector 2 does not flow to the diagnostic current drive circuit 7 and the current detection circuit 9 even during actual driving of the injector 2, so that it is possible to avoid a size increase of the current detection circuit 9.

In addition, feedback control for making the current minute is not required so as to prevent the injector 2 from injecting fuel when checking the operation of the fuel cut signal 5, and thus, it is possible to suppress a cost increase.

Further, the diagnostic current drive circuit 7 and the current detection circuit 9 are separate circuits from the injector drive circuit 3, and thus, it is possible to obtain the same effects even when the present invention is applied to not only a direct injection injector drive circuit but also other drive circuits.

That is, according to the first embodiment, it is possible to realize the electronic control device, which has an abnormality detection circuit that is compact, does not require a complicated circuit, and is capable of suppressing the cost increase when being applied to not only the direct injection injector drive circuit but also other drive circuits, and an abnormality/normality determination method of the electronic control device.

Incidentally, the switch 8 (SW1) and the diagnostic current drive circuit 7 can be omitted if the current I2 is a minute current so as not to affect fuel injection characteristics during an operation of an engine.

In addition, the current detection circuit 9 may be mounted on the injector 2 side with respect to the diagnostic current drive circuit 7.

Second Embodiment

Next, a second embodiment of the present invention will be described.

In the first embodiment, it is configured such that a short pulse of the fuel cut signal 5 is used to cause a current to flow to such an extent that fuel injection of the injector 2 does not occur.

However, there is a possibility that a short pulse of the fuel cut signal 5 is not produced, for example, when an inductance component of the injector 2 is small and a current change becomes steep or when a current change becomes steep because a resistance value of the injector 2 decreases in a low temperature state.

Therefore, the second embodiment of the present invention is a configuration example in which the short pulse is not necessarily produced with the fuel cut signal 5.

Figure 4:
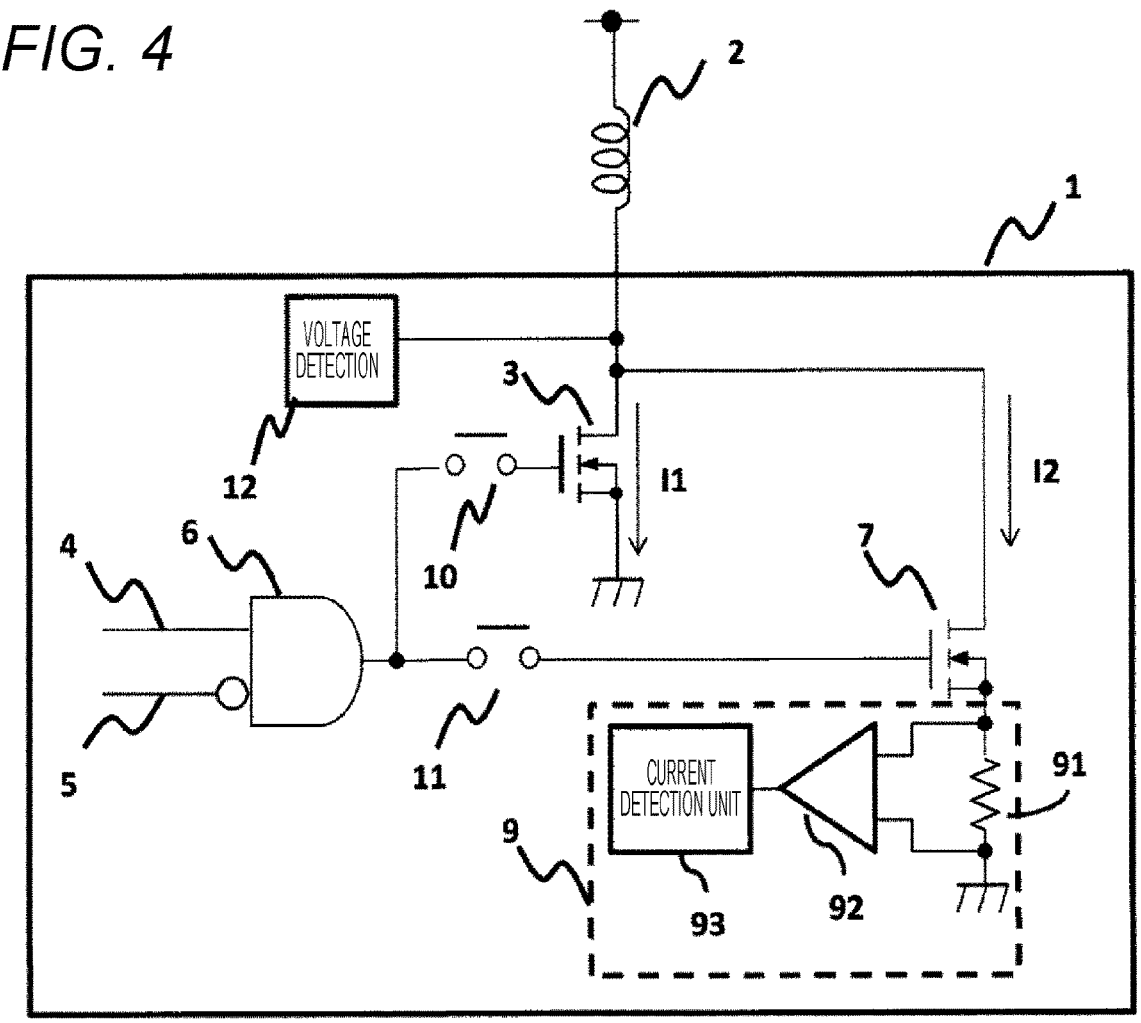
FIG. 4 is a block diagram illustrating a schematic configuration example in a case where an electronic control device according to a second embodiment of the present invention is arranged in an ECU.

FIG. 4 is a block diagram illustrating a schematic configuration example in a case where an electronic control device according to the second embodiment of the present invention is arranged in an ECU 1.

A difference between the first embodiment and the second embodiment is that a line in which the fuel injection signal 4 is supplied to a gate of the diagnostic drive circuit 7 is eliminated, and an output terminal of the logic circuit 6 is connected to a gate of the injector drive circuit 3 via a switch 10 (SW2 (second switch)) and is connected to the gate of the diagnostic current drive circuit 7 via a switch 11 (SW3 (third switch)). In addition, a voltage detection circuit (voltage detection unit) 12 that detects a change of a voltage Vd between the injector 2 and the injector drive circuit 3 is arranged in the second embodiment.

Incidentally, the fuel injection signal output unit 14, the fuel cut signal output unit 15, the operation control unit 16, and the abnormality/normality determination unit 17 illustrated in FIG. 1 are provided in the example of FIG. 4 although not illustrated. However, the operation control unit 16 is configured to perform opening and closing control of the switch 10 and the switch 11. In addition, it is configured such that an output of the voltage detection circuit 12 is supplied to the abnormality/normality determination unit 17.

Figure 5:
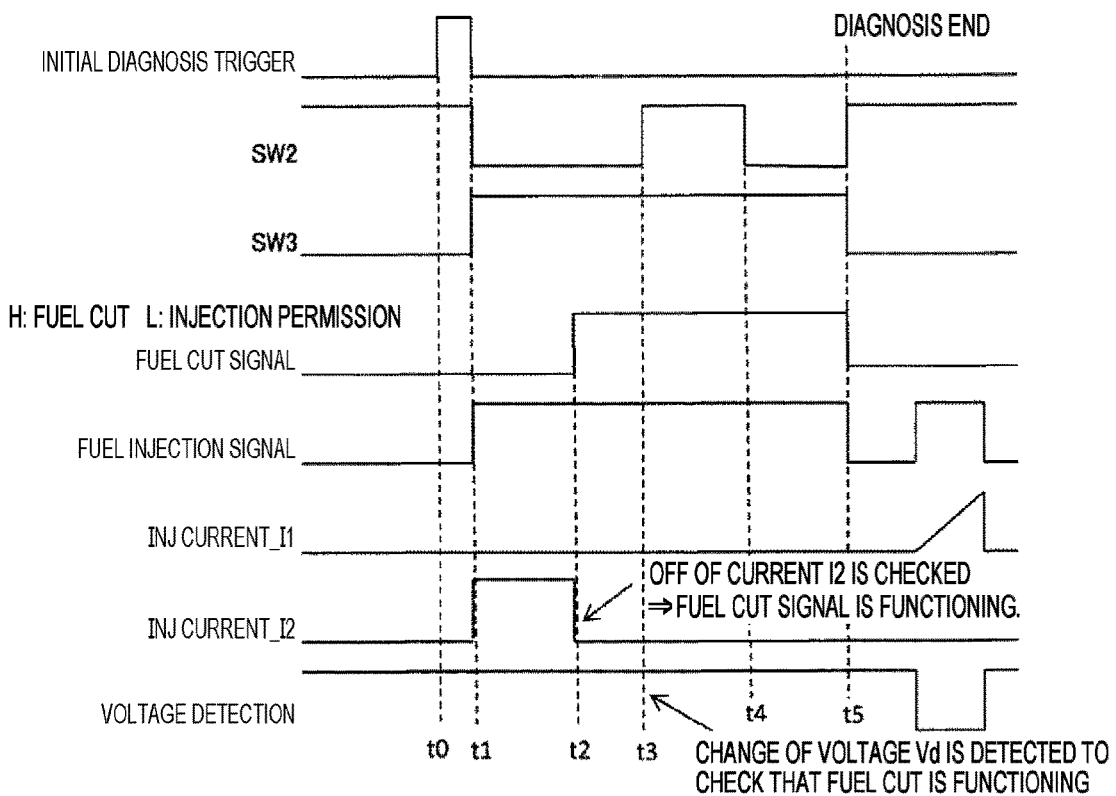
FIG. 5 is a diagram illustrating a diagnostic sequence of a fuel cut signal in the case of using the circuit configuration illustrated in FIG. 4.

FIG. 5 is a diagram illustrating a diagnostic sequence of the fuel cut signal 5 in the case of using the circuit configuration illustrated in FIG. 4.

When an initial diagnosis execution trigger is input at a time t0, the switch 10 (SW2) is switched from ON to OFF, and the switch 11 (SW3) is switched from OFF to ON at a time t1. At this time, if the fuel injection signal 4 is set to H when the fuel cut signal 5 is low (L), that is, in a permission state, the current I2 flows since the diagnostic current drive circuit 7 is turned on although the current I1 does not flow.

Since the diagnostic current drive circuit 7 and the current detection resistor 91 of the current detection circuit (current detection unit) 9 have sufficiently high resistance values, as the current I2, a current flows to such an extent that the injector 2 does not inject fuel. In such a state, the fuel cut signal 5 is set to H, that is, a fuel injection prohibition state where fuel cut is executed at a time t2, the diagnostic current drive circuit 7 is turned off, and the current I2 does not flow.

As the change of the current I2 is detected by the current detection circuit 9, it is possible to check that the fuel cut signal 5 is operating.

In addition, even when the switch 10 (SW2) is turned on at a time t3, the injector drive circuit 3 is not turned on as long as the fuel cut signal 5 is set to H, that is, a prohibition side. This state can be detected by the voltage detection circuit 12. That is, since the voltage detected by the voltage detection circuit 12 maintains a constant value from the time to, it is possible to check that the fuel cut signal 5 can cut the current flowing to the injector 2 and that the operation of the injector drive circuit 3 can be set to the prohibition state.

Figure 6:
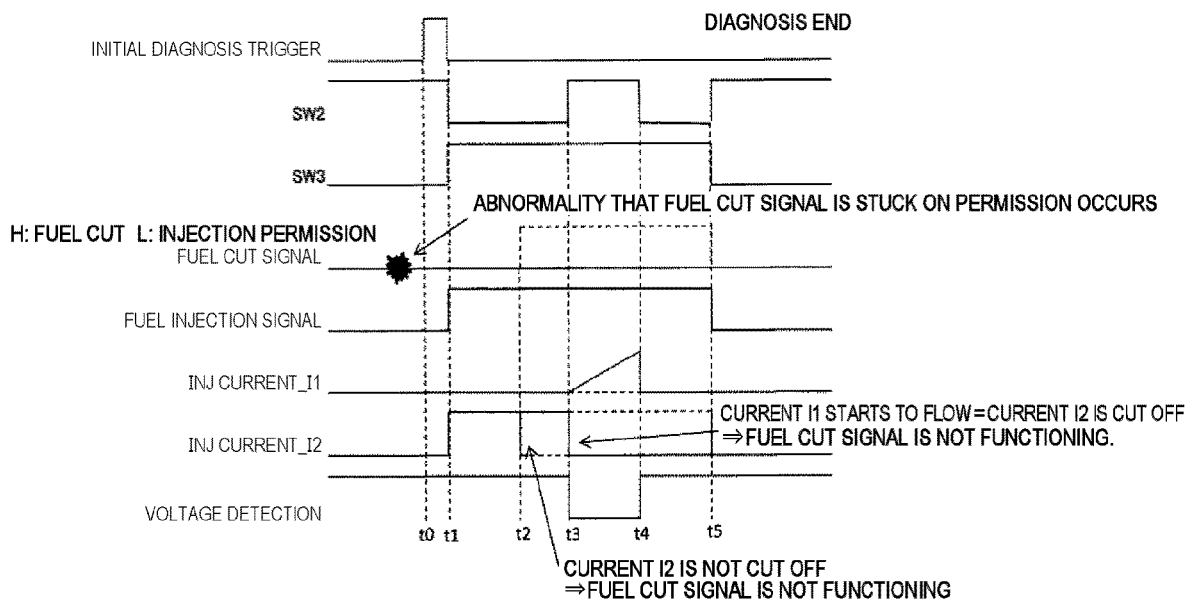
FIG. 6 is a diagram illustrating a sequence in a case where an abnormality occurs in the fuel cut signal in the case of using the circuit configuration illustrated in FIG. 4.

FIG. 6 is a diagram illustrating a sequence in a case where an abnormality occurs in the fuel cut signal 5 in the case of using the circuit configuration illustrated in FIG. 4.

As an example of the abnormality, a case where the fuel cut signal 5 is stuck on the permission side will be exemplified.

In FIG. 6, when a diagnosis execution trigger is input at a time t0, the switch 10 (SW2) is switched from ON to OFF, and the switch 11 (SW3) is switched from OFF to ON at a time t1. At this time, if the fuel injection signal 4 is set to H when the fuel cut signal 5 is low (L), that is, in a permission state, the current I2 flows since the diagnostic current drive circuit 7 is turned on although the current I1 does not flow.

At a time t2, the fuel cut signal 5 is actually set to L because the fuel cut signal 5 is stuck on the permission side although the fuel cut signal 5 is desirably set to H. The diagnostic current drive circuit 7 is turned on when the fuel injection signal 4 is set to H. Although the current I2 needs to be L in a state where the fuel cut signal 5 is in the H state, it is difficult to detect such a current change that the current I2 becomes L, which enables detection of the abnormality of the fuel cut signal 5.

In addition, when the switch 10 (SW2) is turned on at a time t3, the drive circuit 3 is not turned on if the fuel cut signal 5 is in the H state, and the voltage detected by the voltage circuit 12 is in the H state. On the other hand, if the fuel cut signal 5 is in the L state, the drive circuit 3 is turned on, the current I1 starts to flow, and the voltage detected by the voltage detection circuit 12 becomes L. Accordingly, it is possible to determine (detect) the abnormality of the fuel cut signal 5 by monitoring the voltage detected by the voltage detection circuit 12.

Further, the drive circuit 3 is turned off before the fuel is injected from the injector 2 by turning off the switch 10 (SW2) at a time t4 so that the current I1 does not flow. At a time t5, the diagnosis is ended.

As described above, even when it is difficult to produce the short pulse of the fuel cut signal 5, the same effects as those of the first embodiment can be obtained according to the second embodiment of the present invention.

Incidentally, the fuel cut signal 5 may be a signal from the inside the ECU 1 which is a microcomputer, or may be a signal input from a microcomputer monitoring function of the ECU 1 which is the microcomputer.

In addition, the fuel cut signal 5 may be input from an OR circuit that takes both the signal from the ECU 1 and the signal from an icon monitoring function as input signals.

Figure 7:
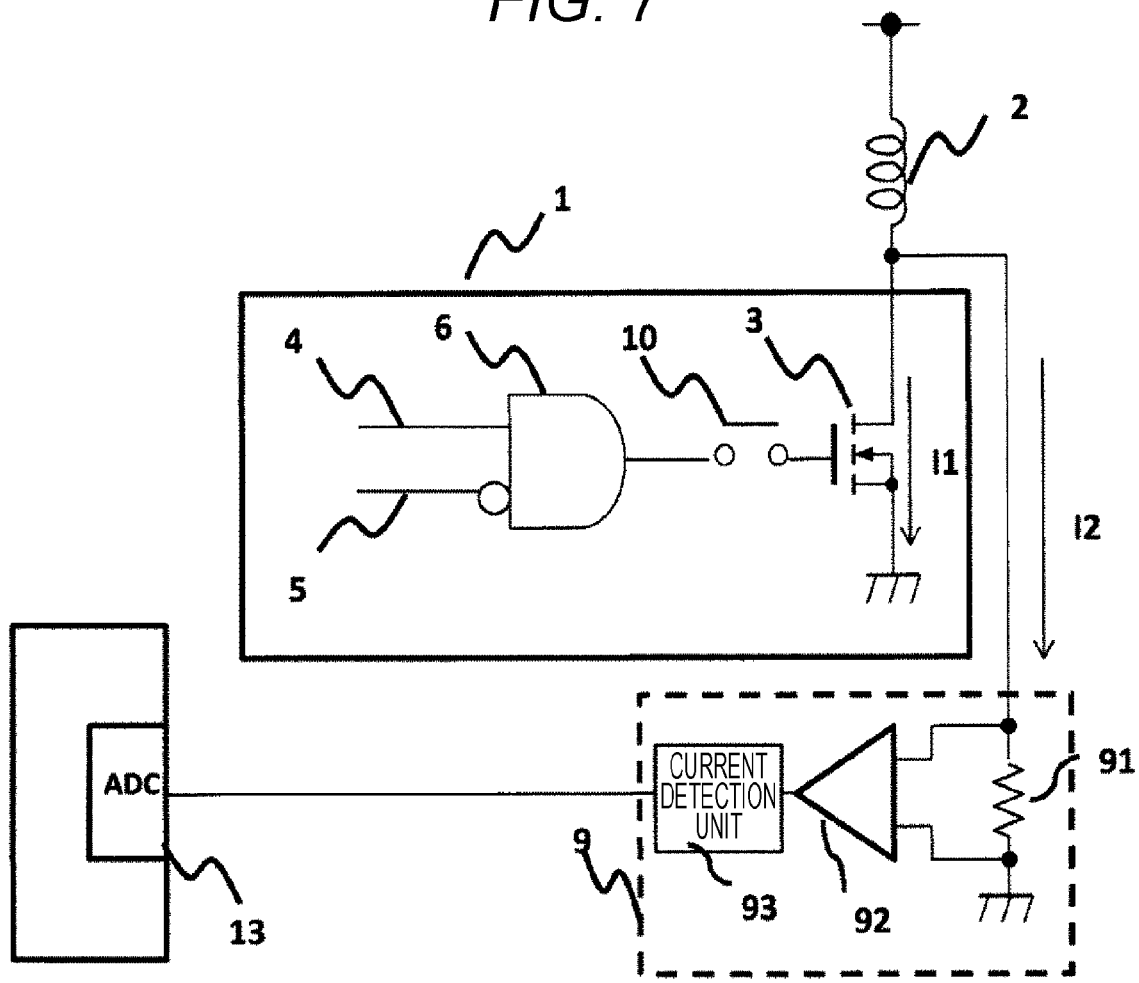
FIG. 7 is a block diagram illustrating a modified example of the second embodiment of the present invention.

In addition, when the current I2 flowing to the current detection resistor 91 of the current detection circuit 9 can be made small so as not to affect the fuel injection from the injector 2 in the second embodiment, it may be configured such that the switch 10 is arranged between the output terminal of the logic circuit 6 and the gate of the injector drive circuit 3 and a signal from the current detection circuit 9 may be read by an AD converter 13 or the like mounted inside the microcomputer (ECU) 1, for example, even if the switch 8 and the diagnostic drive circuit 7 are removed as illustrated in FIG. 7. Incidentally, the voltage detection circuit 12 illustrated in FIG. 4 is not illustrated in FIG. 7, but is also provided in the example of FIG. 7.

The above respective embodiments and various modified examples have been described only as examples, and the present invention is not limited thereto as long as the characteristics of the invention are not compromised.

REFERENCE SIGNS LIST

1 ECU
2 injector
3 injector drive circuit
4 fuel injection signal
5 fuel cut signal
6 logic circuit
7 diagnostic current drive circuit
8 switch (SW1 (first switch))
9 current detection circuit
10 switch (SW2 (second switch))
11 switch (SW3 (third switch))
12 voltage detection circuit
13 AD converter
14 fuel injection output unit
15 fuel cut signal output unit
16 operation control unit
17 abnormality/normality determination unit
91 current detection resistor
92 differential amplifier
93 current detection unit

The invention claimed is:
1. An electronic control device comprising:
an injector drive unit that causes an injector driving current to flow to an injector which injects fuel;
a logic unit that is supplied with a fuel injection signal and a fuel cut signal and drives the injector drive unit according to the fuel injection signal and the fuel cut signal;
a diagnostic current drive unit that flows a minute current to the injector;
a current detection unit that detects the minute current flowing to the injector; and
an abnormality/normality determination unit that determines whether the fuel cut signal is normally supplied to the logic unit based on the minute current detected by the current detection unit,
wherein a combined resistance value of the diagnostic current drive unit and a current detection unit is higher than a resistance value of the injector drive unit, and
wherein the current detection unit is connected in parallel with the injector drive unit.

2. The electronic control device according to claim 1, wherein
the minute current is a current which is smaller than an injector driving current and is a current at which fuel injection from the injector is not executed.

3. The electronic control device according to claim 2, further comprising
an operation control unit that sets the fuel injection signal to a high state in order to cause the injector driving current to flow by the injector drive unit and sets the fuel cut signal to a state where fuel cut is not executed for a short time in a period in which the fuel injection signal is in the high state,
wherein the short time is a time when fuel injection from the injector is not executed.

4. The electronic control device according to claim 3, wherein
when the fuel cut signal is in the state where the fuel cut is not executed for the short time, the abnormality/normality determination unit determines that the fuel cut signal is normally operating if the minute current detected by the current detection unit has changed.

5. The electronic control device according to claim 4, further comprising:
the diagnostic current drive unit that is connected between the injector and the current detection unit and causes the minute current to flow from the injector to the current detection unit; and
a first switch that switches whether to supply the fuel injection signal to the diagnostic current drive unit,
wherein the diagnostic current drive unit causes the minute current to flow from the injector to the current detection unit in a state where the fuel injection signal is supplied to the diagnostic current drive unit via the first switch, the state where the fuel cut signal executes the fuel cut.

6. The electronic control device according to claim 1, further comprising:
a voltage detection unit that detects a voltage between the injector drive unit and the injector; and
a second switch that switches whether to supply an output signal from the logic unit to the injector drive unit,
wherein a state where the minute current is detected by the current detection unit is changed to a state where the minute current is not detected when the fuel cut signal is in the state of executing the fuel cut, and
it is determined that the fuel cut signal is normally operating in a case where the voltage detected by the voltage detection unit does not change when the output signal from the logic unit is supplied to the injector drive unit by the second switch in the state where the minute current is not detected.

7. The electronic control device according to claim 6, further comprising:
the diagnostic current drive unit that is connected between the injector and the current detection unit and causes the minute current to flow from the injector to the current detection unit; and
a third switch that switches whether to supply the output signal from the logic unit to the diagnostic current drive unit.

8. An abnormality/normality determination method of an electronic control device, which includes: an injector drive unit that causes an injector driving current to flow to an injector which injects fuel; a logic unit that is supplied with a fuel injection signal and a fuel cut signal and drives the injector drive unit according to the fuel injection signal and the fuel cut signal; a diagnostic current drive unit that flows a minute current to the injector; and a current detection unit that detects the minute current flowing to the injector, the method comprising:
determining whether the fuel cut signal is normally supplied to the logic unit based on the minute current detected by the current detection unit,
wherein a combined resistance value of the diagnostic current drive unit and the current detection unit is higher than a resistance value of the injector drive unit, and
wherein the current detection unit is connected in parallel with the injector drive unit.

9. The abnormality/normality determination method of the electronic control device according to claim 8, wherein
the minute current is a current which is smaller than an injector driving current and is a current at which fuel injection from the injector is not executed.

10. The abnormality/normality determination method of the electronic control device according to claim 9, wherein
the fuel injection signal is set to a high state in order to cause the injector driving current to flow by the injector drive unit, and the fuel cut signal is set to a state where fuel cut is not executed for a short time during which fuel injection is not executed by the injector in a period in which the fuel injection signal is in the high state.

11. The abnormality/normality determination method of the electronic control device according to claim 10, wherein
when the fuel cut signal is in the state where the fuel cut is not executed for the short time, it is determined that the fuel cut signal is normally operating if the minute current detected by the current detection unit has changed.

12. The abnormality/normality determination method of the electronic control device according to claim 11, wherein
the electronic control device includes: the diagnostic current drive unit that is connected between the injector and the current detection unit and causes the minute current to flow from the injector to the current detection unit; and a first switch that switches whether to supply the fuel injection signal to the diagnostic current drive unit, and
the diagnostic current drive unit causes the minute current to flow from the injector to the current detection unit in a state where the fuel injection signal is supplied to the diagnostic current drive unit via the first switch, the state where the fuel cut signal executes the fuel cut.

13. The abnormality/normality determination method of an electronic control device according to claim 8, wherein
the electronic control device includes: a voltage detection unit that detects a voltage between the injector drive unit and the injector; and a second switch that switches whether to supply an output signal from the logic unit to the injector drive unit,
a state where the minute current is detected by the current detection unit is changed to a state where the minute current is not detected when the fuel cut signal is in the state of executing the fuel cut, and
it is determined that the fuel cut signal is normally operating in a case where the voltage detected by the voltage detection unit does not change when the output signal from the logic unit is supplied to the injector drive unit by the second switch in the state where the minute current is not detected.

\* \* \* \* \*